(12) United States Patent
Noiseux et al.

(10) Patent No.: US 7,040,576 B2
(45) Date of Patent: May 9, 2006

(54) FIRE SHIELD APPARATUS AND METHOD

(75) Inventors: Noel Noiseux, La Prairie (CA); Martin Bernard, Boucherville (CA); Michael Owen Whiting, St. Bruno de Montarville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 54 days.

(21) Appl. No.: 10/737,769

(22) Filed: Dec. 18, 2003

(65) Prior Publication Data

US 2005/0151017 A1    Jul. 14, 2005

(51) Int. Cl.
*B64D 45/00*    (2006.01)

(52) U.S. Cl. .................................... 244/129.2

(58) Field of Classification Search ............. 244/129.2; 60/39.02, 39.08

See application file for complete search history.

(56) References Cited

U.S. PATENT DOCUMENTS

| 2,952,125 | A |   | 9/1960  | Brunton           |         |
|-----------|---|---|---------|-------------------|---------|
| 4,418,879 | A |   | 12/1983 | Vanderleest       |         |
| 4,441,314 | A | * | 4/1984  | Fitton            | 60/266  |
| 4,706,908 | A |   | 11/1987 | Huffman et al.    |         |
| 5,239,817 | A |   | 8/1993  | Mildenstein et al.|         |
| 5,265,408 | A | * | 11/1993 | Sheoran et al.    | 60/782  |
| 5,397,080 | A |   | 3/1995  | Berg              |         |
| 5,501,284 | A |   | 3/1996  | Clodfelter et al. |         |
| 5,524,846 | A |   | 6/1996  | Shine et al.      |         |
| 5,655,359 | A |   | 8/1997  | Campbell et al.   |         |
| 6,264,137 | B1|   | 7/2001  | Sheoran           |         |
| 6,272,838 | B1|   | 8/2001  | Harvell et al.    |         |

FOREIGN PATENT DOCUMENTS

EP    0 514 119    11/1992

* cited by examiner

*Primary Examiner*—Tien Dinh
(74) *Attorney, Agent, or Firm*—Ogilvy Renault LLP

(57) ABSTRACT

Provided is a method and system for providing fire shield protection to an aircraft auxiliary power unit, or portion thereof, or to other aircraft systems.

6 Claims, 3 Drawing Sheets

FIRE SHIELD APPARATUS AND METHOD

FIELD OF THE INVENTION

The present invention relations to the provision of fire protection and, more particularly, to a body containing a pressurised fluid.

BACKGROUND

Although inflight occurrences of fire are rare, both prudence and government regulation dictate that fire protection be provided onboard aircraft. Onboard fire protection measures should ideally be not only effective but also lightweight, extremely reliable, low maintenance and low cost, among other things. The use of fireproof or fire-resistant materials is often proposed for use in fire risk areas such as oil coolers and heat exchangers containing flammable fluids (such as fuel), however the use of such materials typically adds unwanted weight and cost. Nonetheless, this solution does offer satisfactory reliability essentially because its achieves fire protection self-sufficiently and automatically. Still, improvement in cost and weight remain desired.

SUMMARY

The present application is aimed at providing improved fire protection for heat exchanger and other onboard equipment having matrix surface(s) within an aircraft fire zone which may be exposed to direct flame impingement in case of a fire event. This therefore allows the use of non-fire proof materials, if desired.

In one aspect, the present invention provides a fire protection apparatus for an aircraft engine air-cooled heat exchanger located in a compartment, the heat exchanger having an air-entry inlet facing the compartment and a flammable fluid contained therein, the fluid being pressurized during engine operation, the fire protection apparatus comprising: a cover mounted adjacent the heat exchanger and moveable between at least an open position and a closed position wherein the cover substantially covers the air-entry inlet and thereby adapted to at least partially block flames in the compartment from directly impinging the heat exchanger; and a cover-moving assembly adapted to move the cover between the open and closed positions, the cover-moving assembly communicating with pressure of said fluid inside the heat exchanger, said pressure providing a primary moving force to the cover-moving assembly.

In another aspect, the invention provides a fire protection apparatus for a compartment of an aircraft, the fire protection apparatus comprising: at least one shield member adapted to substantially block impingement of flames of a compartment fire on a body when the at least one shield member is in a closed position; and actuation means for moving the at least one shield member between said closed position and an open position, the actuation means partially comprising a source of pressure generated on the aircraft for a first purpose unrelated to operation of said actuation means.

In another aspect, the invention provides a method of protecting a body from fire impingement in an aircraft compartment, the method comprising the steps of providing a moveable cover to selectively cover the body, the cover moveable between at least an open and a closed position, generating a fluid pressure for a first purpose, and using said fluid pressure to move the cover to one of said positions.

BRIEF DESCRIPTION OF THE DRAWINGS

FIG. 3b is a schematic side cross-section view of the apparatus of FIG. 3a; and

DETAILED DESCRIPTION

The present invention will now be described with reference to the fire protection of an oil cooler for an aircraft auxiliary power unit (APU), however it will be understood that the invention is applicable to other aircraft heat exchangers using air as the cooling medium, and particularly those used to cool onboard flammable fluids. The present invention is related to co-pending patent application Ser. No. 10/370,803 filed 20 Feb. 2003, commonly assigned herewith, and the contents of that application are incorporated herein by this reference.

Figure 1:
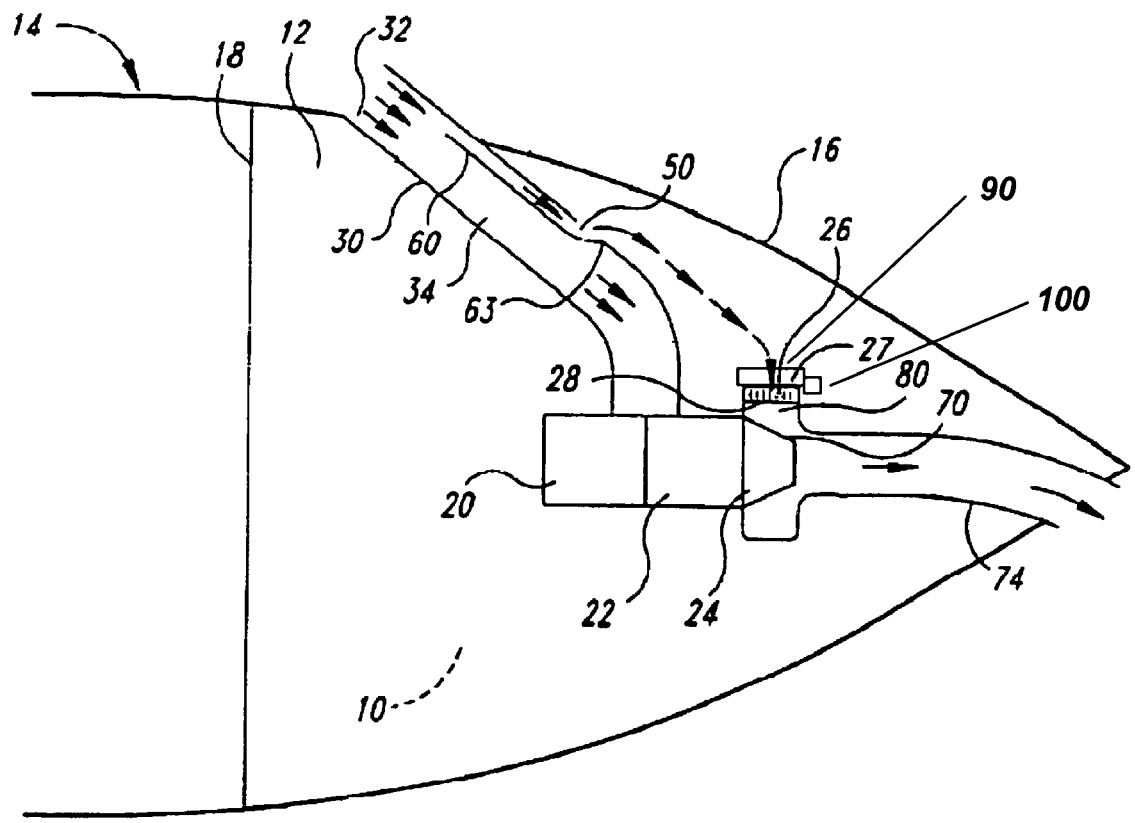
FIG. 1 is a schematic view of a passive cooling system for an auxiliary power unit incorporating the present invention.

FIG. 1 schematically illustrates a passive cooling system for an auxiliary power unit 10. Auxiliary power unit 10 is positioned in a compartment 12, which is located in the aft fuselage of an aircraft 14 having an exterior surface 16. Compartment 12 is separated from the rest of the fuselage by a firewall 18, and exterior surfaces 16 of aircraft 14 form the remaining walls of compartment 12. Auxiliary power unit 10 typically includes a load compressor 20, a power compressor 22 and a turbine 24. An oil cooler 26 is provided to cool oil (not shown) used by auxiliary power unit 10, as will be described further below. Typically, an intake duct 30 extends between an intake opening 32 in exterior surface 16 and auxiliary power unit 10, and defines an airflow passage 34 through which auxiliary power unit 10 draws combustion air. Intake opening 32 typically permits air to flow in the direction of the arrows under the influence of auxiliary power unit 10 itself (ground operation) or the air stream of the aircraft and the auxiliary power unit (flight operation). Intake duct 30 also optionally includes an integral inlet scoop 60 mounted therein to divert a portion of the air flowing through airflow passage 34 into compartment 12 via a compartment outlet 50. Auxiliary power unit 10 also has an exhaust exit 70 positioned in an exhaust passage 74 leading to the exterior of aircraft 14. An eductor 80 is positioned between exit 70 and oil cooler 26.

When auxiliary power unit 10 is in operation, high-speed exhaust exiting at 70 creates a low-pressure region in eductor 80. The low-pressure region in eductor 80 causes air to be drawn from compartment 12 and through oil cooler 26, entering a compartment side 27 of the oil cooler 26 and then exiting from an eductor side 28 into eductor 80. The cooling air is then mixed with the exhaust from auxiliary power unit 10 and expelled into the ambient environment. Oil passing through the oil cooler 26 is thus cooled by the air flow and kept within a desired operating temperature range. Oil cooler may be provided of any suitable material, preferably a fire resistant material and preferably also clad with a fireproof material and insulation, however unlike the prior art the material of oil cooler 26 itself need not be fireproof, as additional fire protection means are provided, as will now be described.

Since air is drawn from the compartment 12 into heat exchanger 26, heat exchanger 26 must be provided with fireproofing to protect against any damage that may be cause in the unlikely event a fire breaks out in compartment 12 or the engine 10. Accordingly, a fire protection system 90 and an actuator system 100 is provided to selectively cover oil cooler 26 in the event of a fire.

Figure 2:
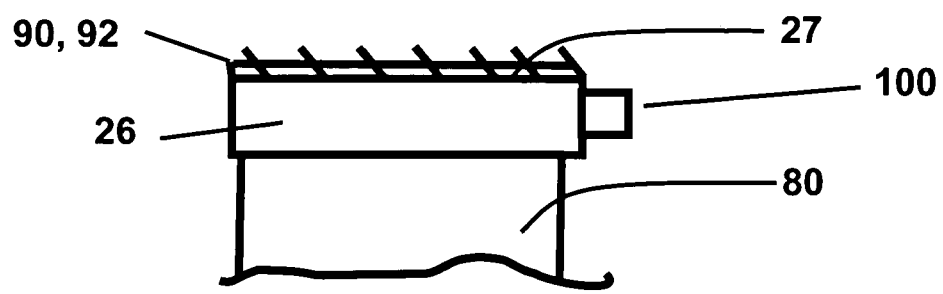
FIG. 2 is an enlarged portion of FIG. 1, showing a first embodiment of an apparatus according to the present invention.
Figure 3A:
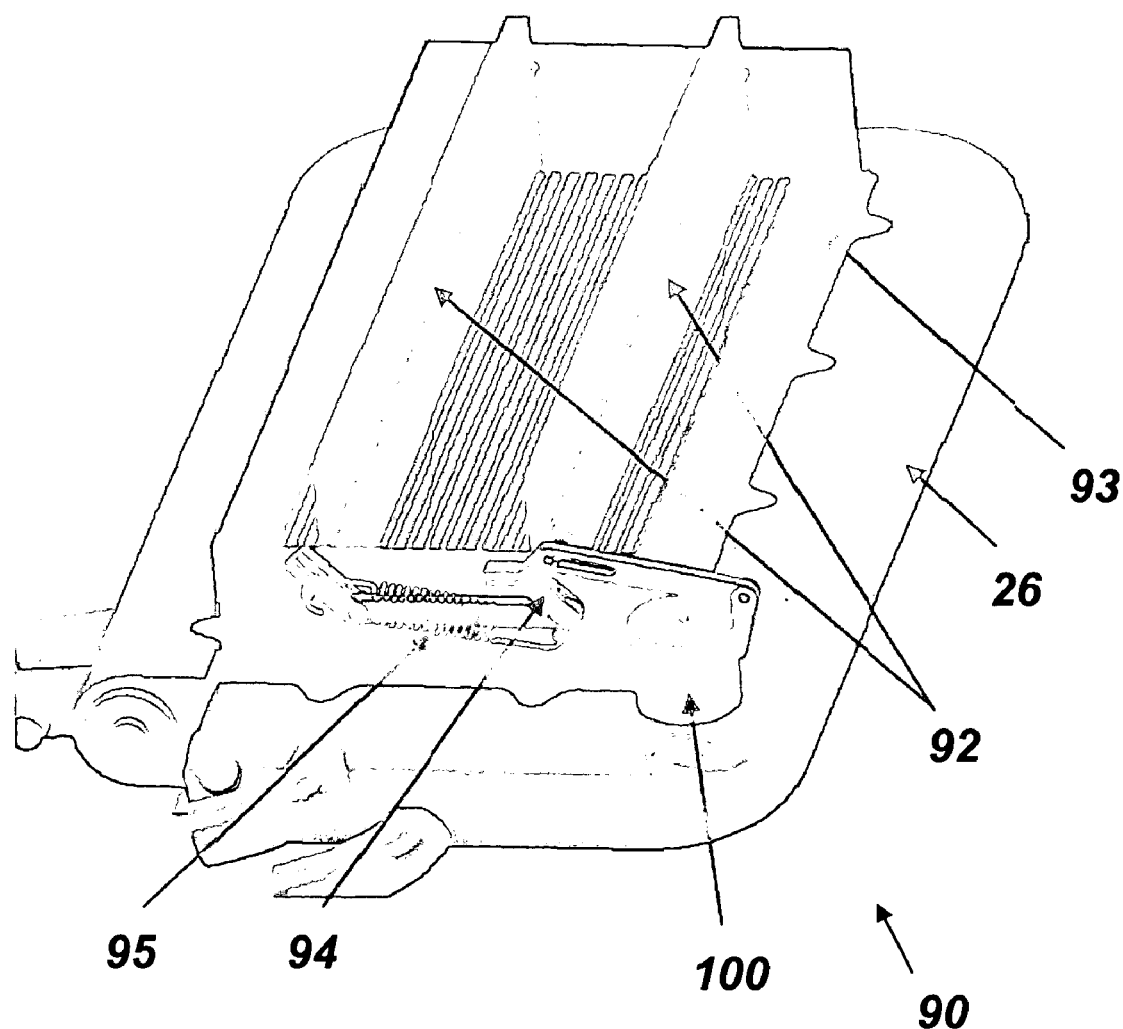
FIG. 3a is an isometric view of the apparatus of FIG. 2.

Referring now to FIG. 2, to prevent direct flame impingement one embodiment of fire protection system 90 includes a plurality of moveable louvers or blinds 92 closable by actuator system 100, as will be described further below. Referring to FIG. 3a, fireproof louvers members 92 are housed in a preferably fireproof metal frame 93 and are installed over the air inlet 27 of oil cooler 26. Louvers 92 are linked together through linkages 94 and thereby also connect to actuation system 100. The louvers 92 are preferably steel doors provided in a fireproof thickness. Fire protection system 90 is of course designed to permit a necessary airflow therethrough, when in the 'open' position, to permit proper operation of oil cooler 26.

Actuation mechanism 100 uses fluid pressure within oil cooler 26, (i.e. the pressure of the media being cooled), to convert pressure into motion useable to actuate the louvers via linkages 94, as described below. Actuation mechanism 100 in this embodiment is biased to the 'closed' position by one or more springs 95, and pressure from oil cooler causes actuator contraction with sufficient force to cause linear motion of linkages 94 to open the louvers; as will be described below. Actuation mechanism 100 also may optionally incorporate a mechanical stop (not shown) to prevent over-travel of the device.

Figure 3B:
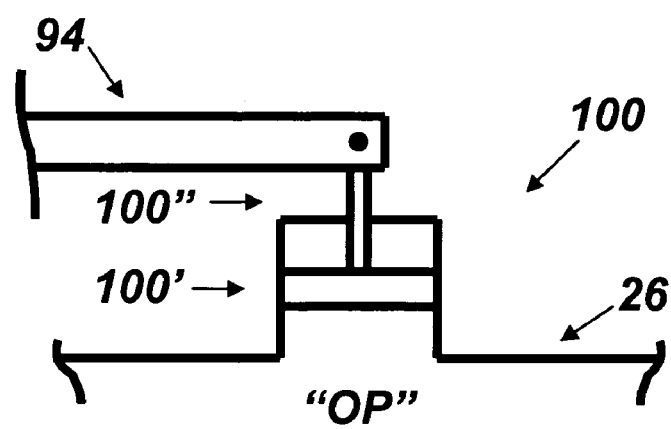

Referring to FIG. 3b, in this embodiment fluid actuator 100 is an integral directly-communicating cylinder, in which pressure "OP" of oil in oil cooler 26 directly moves a piston 100' connected to a cylinder rod 100" connected to linkage 94 (the schematic figure is greatly simplified, but its teachings will be apparent by the skilled reader).

The operation of the present embodiment will now be described. When APU 10 is not operating, oil in cooler 26 is substantially unpressurized and thus no fluid pressure is applied to actuation mechanism 100. Therefore, louvers 92 are biased by springs 95 to the closed position to cover inlet 27 of oil cooler and thereby prevent air flow from passing pass through oil cooler 26. Once APU 10 operation is commenced, operating fluid pressure in oil cooler 26 causes actuation mechanism 100 to move louvers 92 to their fully 'open position'. At APU engine shutdown, fluid pressure in oil cooler 26 will decay and actuation mechanism 100 will consequently lose pressure, permitting springs 95 to close louvers 92.

As the skilled reader will understand, fireproofing regulations typically require that a component pass both a 5-minute engine-operating test, at the worst operating conditions, and a 10-minute fire exposure test with the engine not operating. The present invention preferably provides fire resistance to oil cooler 26 during the running test by construction (e.g. the use of fire-resistant materials and insulation in its construction, etc.) and by providing a pre-selected minimum cooling flow within the cooler matrix with APU 10 running. When the engine is not in operation, fire protection is preferably provided by closure of louvers 92 as described above. Fire proofing is thereby provided using the principle of flame arrestor in that fire protection system 90 is brought to closed position automatically as a consequence the engine shutdown, which is performed after the first 5 minutes of test.

Other embodiments of the present invention are available. Any number (including one) of louvers 94 may be provided so as to substantially shield the cooler from a fire in the compartment when closed. Since fire protection system 90, when closed, protects the heat exchanger 26 from direct impingement by a compartment fire, the heat exchanger to be made of less fire-resistant material such as aluminum, which offers beneficial weight and cost savings.

Figure 4A:
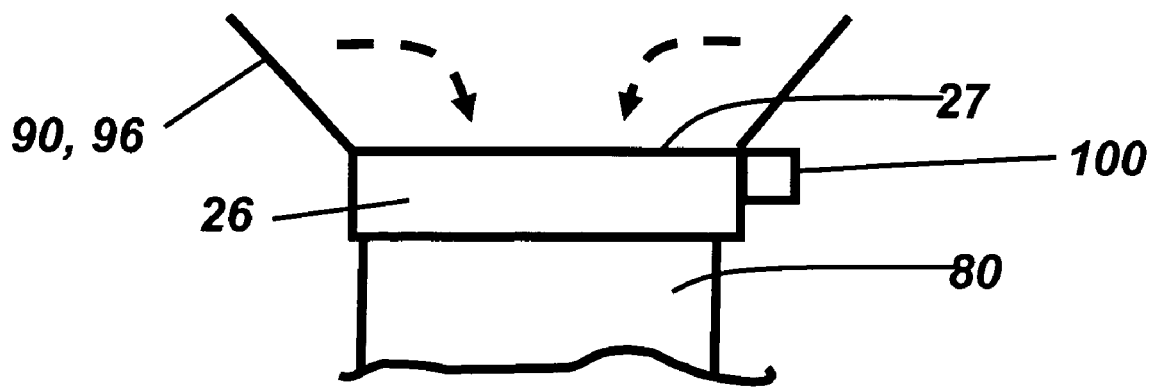
FIGS. 4a–4c are schematic side views of alternate embodiments of the present invention.
Figure 4B:
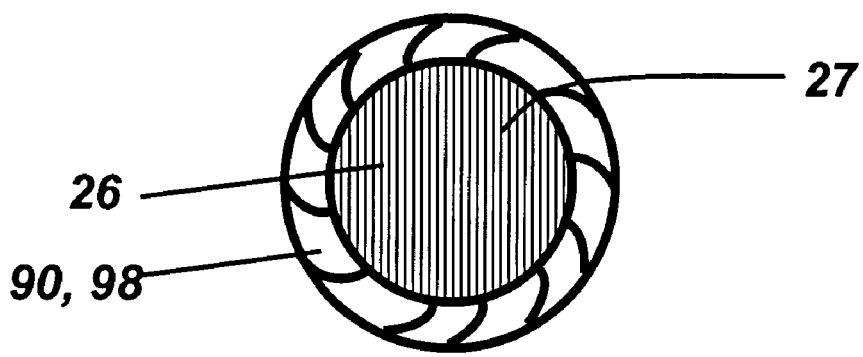
Figure 4C:
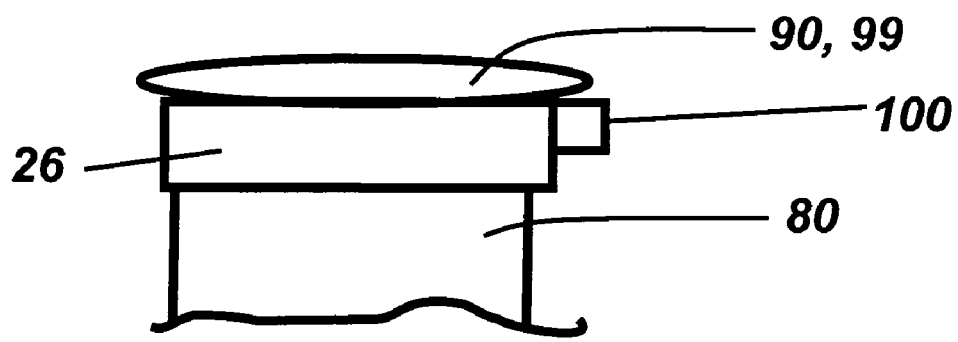

Referring now to FIGS. 4a–4c, additional embodiments are shown, and which are also described in more detail in the incorporated co-pending application Ser. No. 10/370,803 and thus will be described only briefly here. In the embodiment shown in FIG. 4a, fire protection system 90 includes "cabinet" type doors 96 closed by an actuation system 100 including a pneumatic cylinder (not shown) driven by translated hydraulic pressure from oil cooler 26. FIG. 4b shows an embodiment of fire protection system 90 which includes an iris-like sliding plate enclosure 98 (shown only partially closed) activated by an actuation system 100 wherein the driving pressure is not sensed directly from the oil cooler, but from another pressurized fluid system (not shown) of APU 10. FIG. 4c shows an embodiment of fire protection system 90 which includes a fireproof inflatable bladder 99 comprised of a fireproof material actuated by actuation system 100 which includes an actuation system 100 which uses pressure from oil cooler 26 as an inflation pressure (preferably using suitable conversion means, such as may convert oil pressure into air pressure). Nomex™ material is one example (a trademark of E. I. du Pont de Nemours and Company) of a suitable fire proof material.

Still further embodiments and modifications of the present invention are available. For example the flame arrestor portion 90 may be any suitable mechanism or apparatus that will cover or protect the matrix from direct flame impingement. Actuation system 100 may likewise be any suitable mechanical, hydraulic, pneumatic or electrical mechanism that uses a pre-existing fluid pressure, preferably though not necessarily in the heat exchanger, generated as for another purpose in aircraft/engine operation, and used in a dual function by the present invention to generate motion to cause a change in position or state of the fire protection apparatus. The present invention is presented as beneficial to passive cooling systems of the type shown generally in FIG. 1. It will be appreciated, however, that air may be provided in any number of ways to the compartment. For example, scoop 60 and outlet 50 may be absent, and instead a separate conduit (not shown) provided which independently supplies air to compartment 12 (as shown, for example, U.S. Pat. No. 6,092,360), or alternately, a louver (not shown) may be provided in exterior surface 16 of the aircraft (as shown, for example, U.S. Pat. No. 5,265,408). The means by which air is supplied to compartment 12 is not important to the present invention. Other modifications available to the present invention include, but are not limited to the fact that the protected system may be a passive of actively cooled system, may be ducted or unducted, may be an APU, engine or other aircraft system presenting fire risk, may be constructed of any suitable materials, and may be provided with the capability of intermediate-positions (e.g. partially-closed, etc.) if desired. The scope of the appended claims is not intended to be limited, therefore, only to the specific exemplary embodiments described above.

We claim:

1. A fire protection apparatus for an aircraft engine air-cooled heat exchanger located in a compartment, the heat exchanger having an air-entry inlet facing the compartment and a flammable fluid contained therein, the fluid being pressurized during engine operation, the fire protection apparatus comprising:

a cover mounted adjacent the heat exchanger and moveable between at least an open position and a closed position wherein the cover substantially covers the air-entry inlet and thereby adapted to at least partially block flames in the compartment from directly impinging the heat exchanger; and a cover-moving assembly adapted to move the cover between the open and closed positions, the cover-moving assembly communicating with pressure of said fluid inside the heat exchanger, said pressure providing a primary moving force to the cover-moving assembly.

2. The fire protection apparatus of claim 1 wherein the pressure causes the cover-moving assembly to moves the cover to the open position.

3. The fire protection apparatus of claim 1 wherein a lack of pressure causes the cover-moving assembly to moves the cover to the closed position.

4. The fire protection apparatus of claim 1 wherein the cover is biased towards the closed position.

5. The fire protection apparatus of claim 1 wherein the cover-moving assembly is a cylinder and piston.

6. A fire protection apparatus for a compartment of an aircraft, the fire protection apparatus comprising:

at least one shield member adapted to substantially block impingement of flames of a compartment fire on a body when the at least one shield member is in a closed position; and actuation means for moving the at least one shield member between said closed position and an open position, the actuation means partially comprising a source of pressute generated on the aircraft for a first purpose unrelated to operation of said actuation means.

* * * * *